(12) United States Patent
Ashe et al.

(10) Patent No.: US 6,178,016 B1
(45) Date of Patent: Jan. 23, 2001

(54) IMAGING APPARATUS FOR A PHOTOGRAPHIC FILM IMAGE SCANNER

(75) Inventors: Robert E. Ashe, Henrietta; R. Winfield Trafton; Thomas D. Jensen, both of Holley; Stephen C. Arnold, Honeoye Falls, all of NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/083,604

(22) Filed: May 22, 1998

(51) Int. Cl.[7] ....................................................... H04N 1/04
(52) U.S. Cl. ............................................ 358/487; 358/474
(58) Field of Search ................................... 358/400, 401, 358/487, 506, 471, 474, 496, 498; 355/55, 75; 361/679, 686; 348/96

(56) References Cited

U.S. PATENT DOCUMENTS

| | | |
|---|---|---|
| 2,533,478 | 12/1950 | Lee et al. . |
| 2,537,900 | 1/1951 | Lee et al. . |
| 4,317,029 | 2/1982 | Warthan .............................. 235/454 |
| 4,831,455 | 5/1989 | Ishikawa et al. .................... 358/471 |
| 4,886,957 | 12/1989 | Glaberson et al. .................. 235/482 |
| 4,899,214 | 2/1990 | Robbins et al. ..................... 358/401 |
| 5,146,367 | 9/1992 | Newman .............................. 359/820 |
| 5,155,616 | 10/1992 | Yamaguchi et al. ................. 359/216 |
| 5,233,376 * | 8/1993 | Maron .................................. 353/103 |
| 5,233,455 | 8/1993 | Yamaguchi et al. ................. 359/205 |
| 5,258,873 | 11/1993 | Mishina et al. ...................... 359/654 |
| 5,267,043 | 11/1993 | Rottner et al. ....................... 348/104 |
| 5,293,242 | 3/1994 | Mamiya ................................ 348/96 |
| 5,351,139 * | 9/1994 | Miyahara et al. ................... 358/487 |
| 5,355,193 | 10/1994 | Morris .................................. 355/41 |
| 5,448,049 | 9/1995 | Shafer et al. .................... 235/462.05 |
| 5,572,339 | 11/1996 | Edgar et al. ......................... 358/487 |
| 5,673,136 | 9/1997 | Inoue et al. .......................... 359/205 |
| 5,703,701 * | 12/1997 | Yamamoto et al. ................. 358/487 |
| 5,751,451 * | 5/1998 | Ogoshi et al. ....................... 358/487 |
| 5,902,993 * | 5/1999 | Okushiba et al. ................... 358/475 |
| 5,903,401 * | 5/1999 | Tanaka et al. ....................... 358/474 |
| 5,933,222 * | 8/1999 | Hoshino et al. ..................... 355/75 |
| 5,973,729 * | 10/1999 | Washizu ................................ 348/96 |

* cited by examiner

*Primary Examiner*—Cheukfan Lee
(74) *Attorney, Agent, or Firm*—Francis H. Boos, Jr.; Roland R. Schindler, II

(57) ABSTRACT

A compact, low-cost photographic film scanner particularly adapted to scanning Advance Photo System (APS) film includes an imaging assembly having an elongated L-shaped housing with a photosensor, e.g. a CCD, mounted directly to one end of the housing, the other end having a scanning aperture and film rails integrally formed on the housing, the film rails defining a film plane over the scanning aperture. The housing comprises a two piece snap together configuration that provides support for the focusing lens as well the photosensor and film scan gate. Additionally, the housing includes support arms that receive and lock in place an LED illuminant head assembly. The imaging apparatus housing conveniently snap locks into place on the scanner chassis in an opening formed in the film drive path.

20 Claims, 11 Drawing Sheets

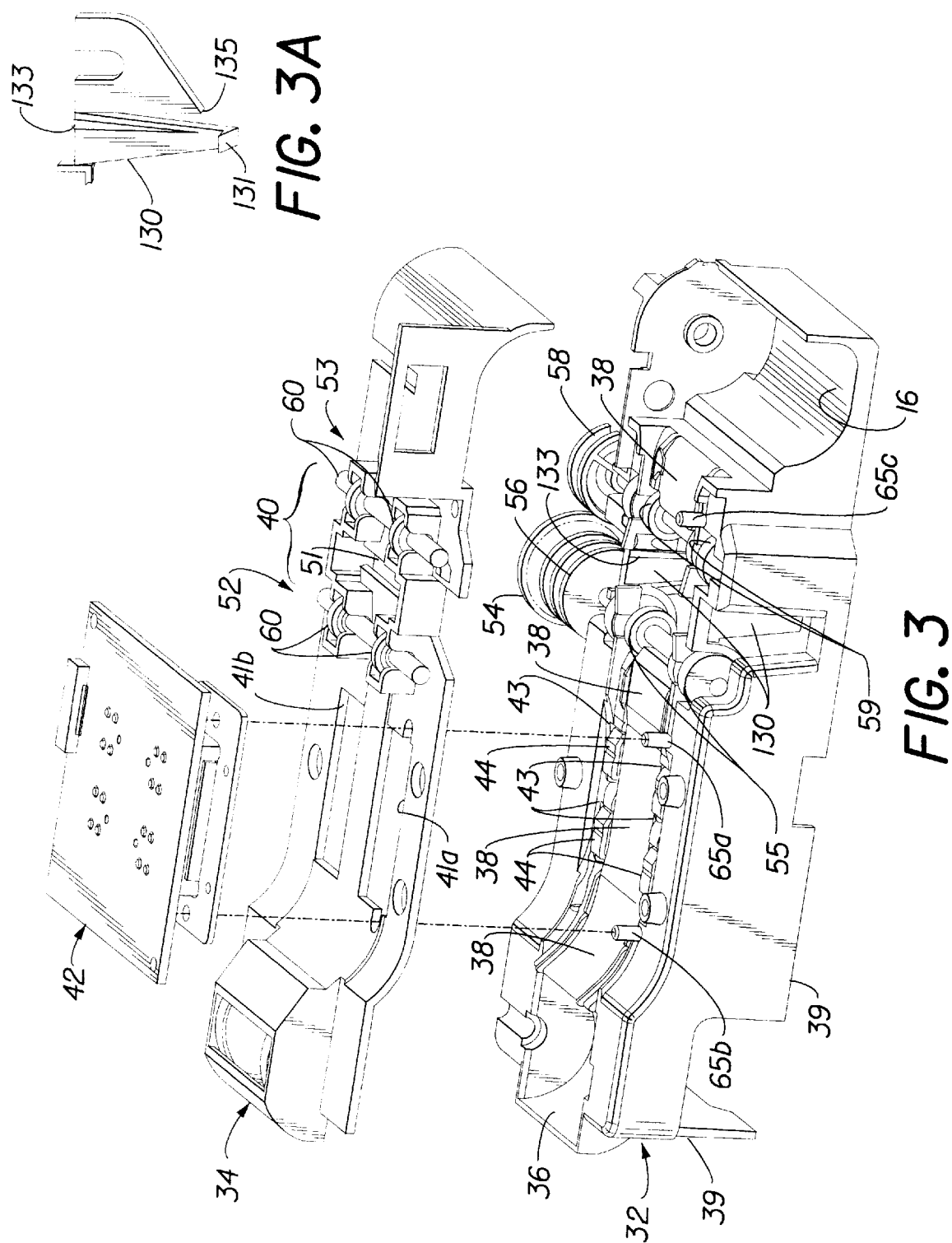

IMAGING APPARATUS FOR A PHOTOGRAPHIC FILM IMAGE SCANNER

CROSS REFERENCE TO RELATED APPLICATIONS

Cross reference is made to commonly assigned, copending U.S. applications, filed concurrently herewith: Ser. No. 09/083,359, entitled "ULTRAVIOLET CURABLE RIVETING OF PRECISION ALIGNED COMPONENTS"; Ser. No. 09/084,062, entitled "ILLUMINANT HEAD ASSEMBLY FOR FILM IMAGE SCANNER"; and Ser. No. 09/083,461, entitled "A COMPACT DOCUMENT SCANNER".

FIELD OF THE INVENTION

The present invention relates generally to the field of photographic media image scanners. More specifically, the invention relates to small, low cost scanners adapted for use with personal computers by consumers who wish to generate digital images from processed film stored in a film cartridge as in the case of the Advanced Photo System (APS) film.

BACKGROUND OF THE INVENTION

Users of personal home computers are increasingly loading digital image files into their computer for viewing, communicating images through the Internet and printing hardcopies on personal color printers. With the introduction of the Advanced Photo System, which stores processed film in the film cartridge, there is a growing interest in being able to scan and digitize images from the stored film for use on the personal computer. Such a scanner should not only be low cost, to obtain broad acceptance as a consumer product, but also needs to be compact in size to be able to fit into a standard disk drive bay on a personal computer.

In designing a film scanner for this type of application, it is important to have a design that uses a minimum of parts, is simple to manufacture and yet creates and maintains critical, micro-precision alignment of the photosensor with the film plane in the scan gate. The design of the present invention fully meets these objectives.

SUMMARY OF THE INVENTION

In accordance with one aspect of the invention an imaging apparatus for a photographic film scanner comprises an elongated housing having first and second ends and a imaging lens assembly mounted within the housing. The first end of the housing has a scanning aperture and film rails integrally formed thereon which defines a scanning film plane aligned with the housing. The imaging apparatus also includes a photosensor device mounted on the second end of the housing in precision alignment with the scanning aperture, the imaging lens assembly being adjusted and fixed in place for precision focus of the scanning film plane on the photosensor device. The result is a compact, low cost imaging apparatus that can be rapidly installed in a film drive chassis and can be easily removed and replaced without the need for intricate realignment and refocusing procedures in the event of failure of the original imaging apparatus.

In accordance with another aspect of the invention, film scanner apparatus is provided comprising a chassis frame having a film path and an opening in the film path; an elongated imaging apparatus including a first end having a scanning aperture and a film guide integrally formed thereon defining a scanning film plane and a second end having a photosensor device mounted thereon in precision alignment and focus with the scanning aperture and the scanning film plane; the first end of the imaging apparatus being mounted to the chassis at the film path opening and the photosensor device being supported at the second end of the imaging apparatus, the imaging apparatus being the sole means of support of the photosensor device from the chassis frame.

In a further aspect of the invention, the first end of the imaging apparatus just described includes a pair of support arms extending through the opening in the film path beyond the level of the film path and the film scanner apparatus further includes an illuminant head assembly mounted on the support arms in alignment with the scanning aperture.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

In the drawings:

FIG. 3 is an exploded perspective view of the film chassis of FIG. 2;

FIG. 3A is a fragment view of imaging housing snap mounting arms incorporated in the chassis of FIG. 3;

DETAILED DESCRIPTION OF THE INVENTION

Figure 1:
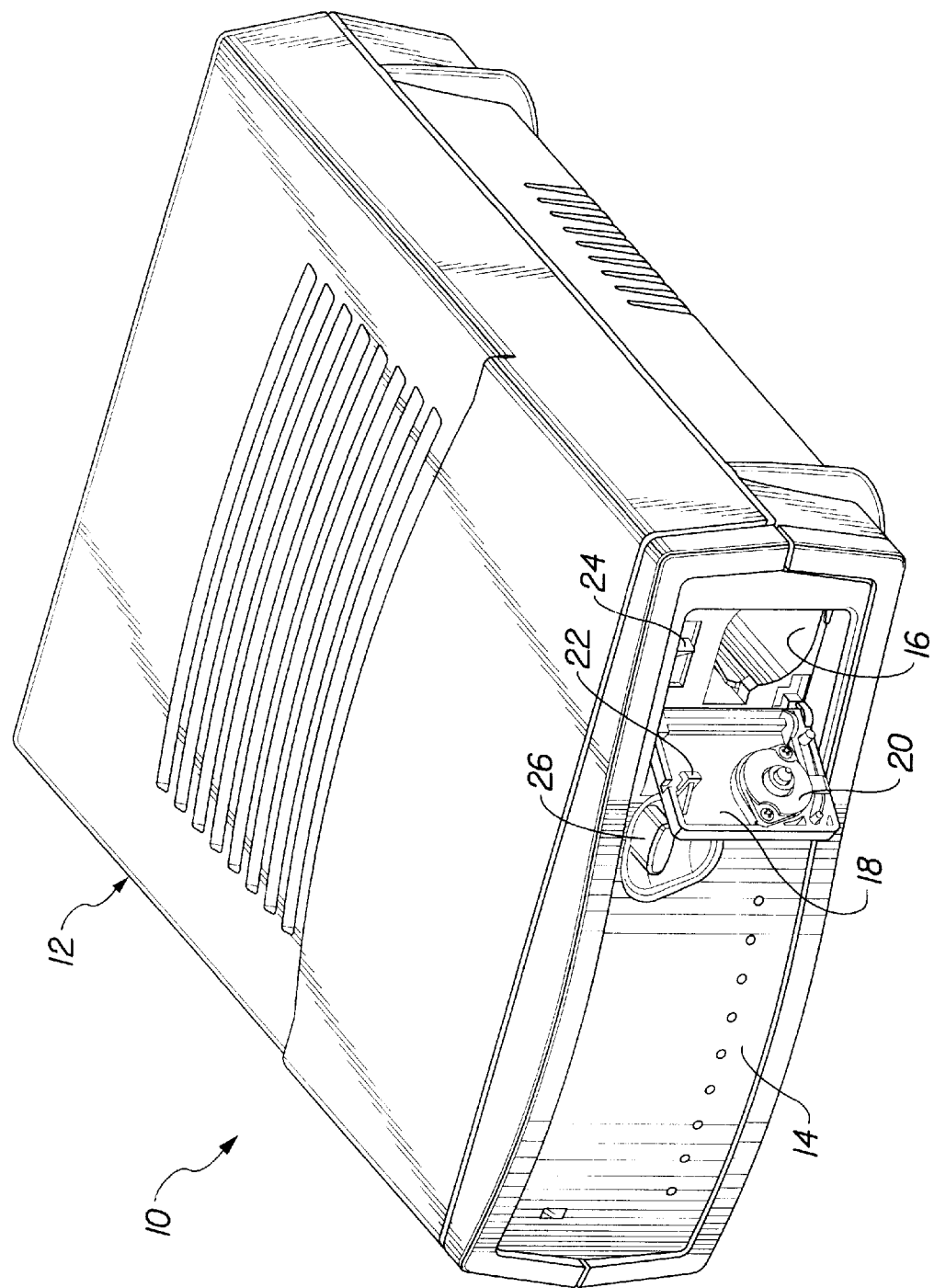
FIG. 1 is an isometric view showing a film scanner embodying the present invention.

In FIG. 1, there is shown a compact film scanner 10 adapted for use with APS film cartridges to convert film images to digital images. The illustrated scanner comprises an outer casing 12 and a front bezel 14 which enclose an internal film drive chassis to be described in more detail below. The chassis is provided with an APS film cartridge chamber 16 for receiving a manually inserted APS film cartridge. A hinged, spring-loaded door 18 includes a locating device 20 which acts to engage the end of the inserted film cartridge (not shown) as the door is closed to aid in properly positioning the film cartridge in the chamber 16. A latch hook 22 on the door engages an internal latching mechanism 24 to lock the door in the closed position. When it is desired to remove the film cartridge, a door release button is actuated to unlock the latch mechanism allowing the door to spring open. An internal spring loaded mechanism (not shown) within the cartridge chamber forces the cartridge partially outward, allowing the user to grasp and remove the cartridge.

Figure 2:
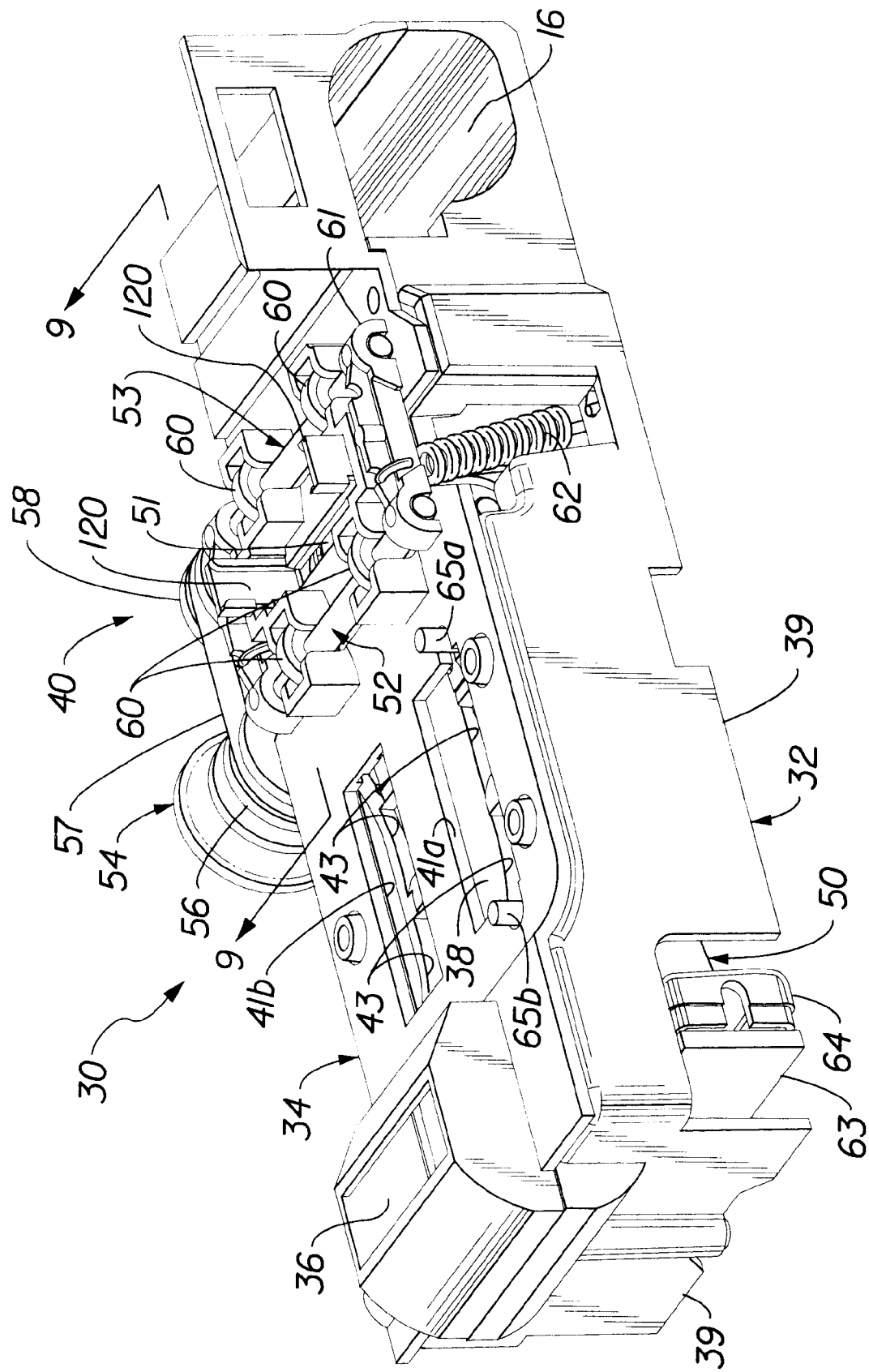
FIG. 2 is a perspective view of a film scanner chassis embodying the present invention.

Referring jointly to FIGS. 2 and 3, a general description of the internal film drive chassis 30 of the scanner 10 is presented here with more specific details provided in reference to ensuing drawing figures. The illustrated chassis comprises a lower frame 32 and an upper plate 34 which, when assembled as shown, define the film cartridge chamber 16, a film takeup chamber 36 and a film path 38 longitudinally extending between the two chambers. A film drive roller mechanism 40, including nip roller sets 52 and 53, is located near the film cartridge chamber 16. A pair of elongated apertures 41a, 41b are provided in upper plate 34 to allow access by magnetic read/write head assembly 42 (FIG. 3) to magnetic data tracks on the magnetic recording layer formed on the APS film thereby enabling data transfer to and from the film magnetic layer, in known manner, as part of the film scanning process. Recesses 43 are formed in the film path portion of the lower frame 32 to receive spring loaded pressure pads 44 (FIG. 3) in alignment with the magnetic read heads (not shown) in the head assembly 42. Lower frame 32 is provided with depending skirt walls 39 that form a cavity in which is mounted imaging apparatus 50.

Figure 4A:
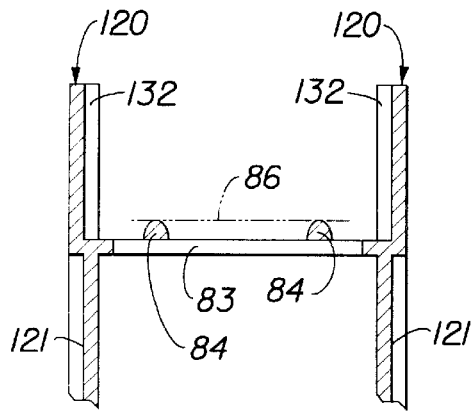
FIG. 4a is partial elevation end view in cross section of the scanning aperture end of the imaging apparatus shown in FIG. 4.
Figure 4:
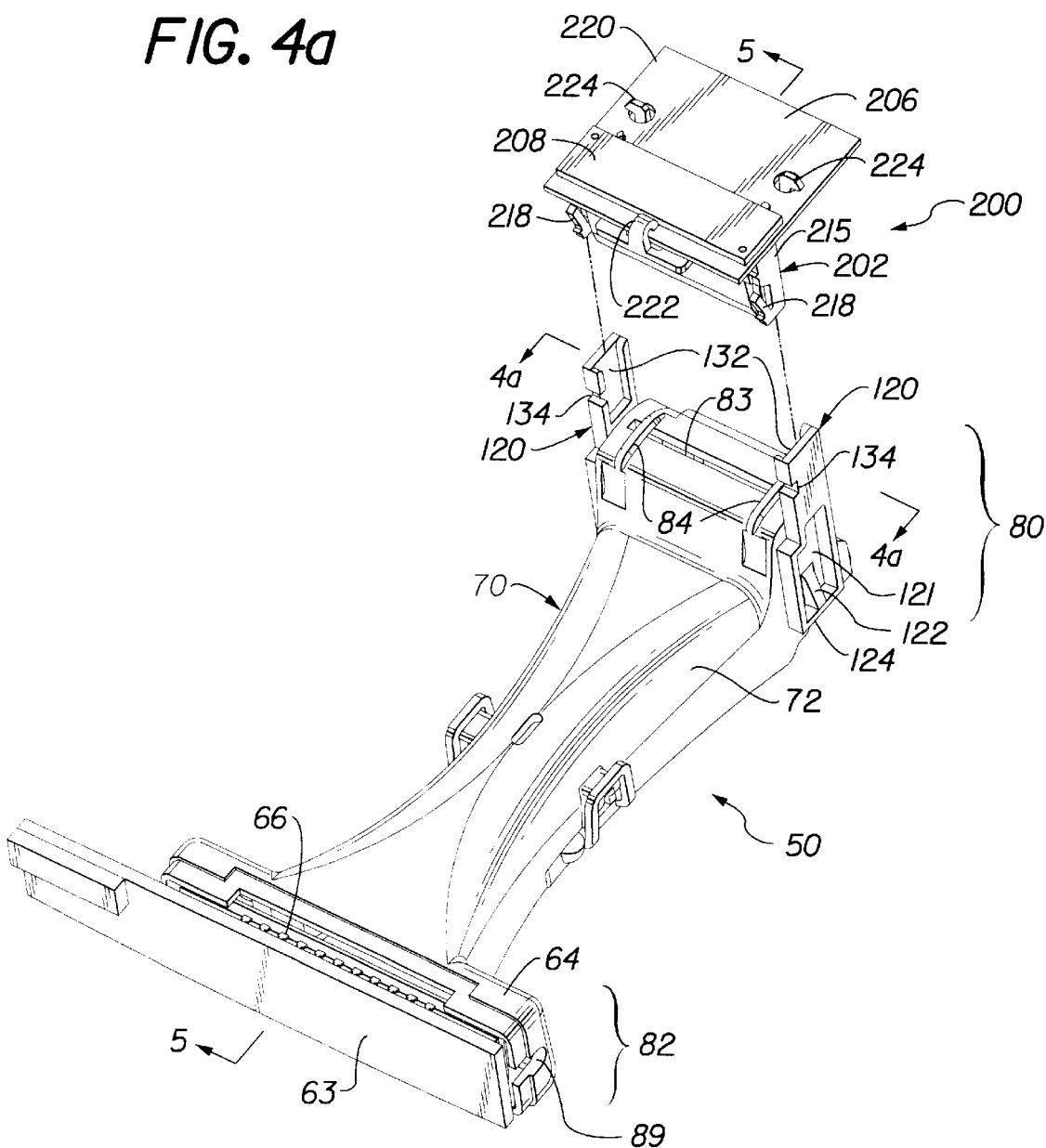
FIG. 4 is a partially exploded perspective view of an imaging apparatus and illumination head embodying principles of the present invention.

One end of the imaging apparatus 50, as will be seen in reference to FIG. 4, comprises a film scanner end which is snap mounted into a film scanner opening 51 formed in the chassis which is straddled by film drive nip roller sets 52 and 53. The nip rollers are driven by a film drive stepper motor (not shown) which is directly coupled via drive gear 54 to main drive rollers 55 and, via pulleys 56 and 58 and elastic drive belt 57, to slave drive rollers 59. Idler rollers 60 are held in place against their respect drive rollers by means of retention clamps 61 held under pressure by tension springs 62. The film scanner end of imaging apparatus 50 includes a pair of upstanding support arms 120 integrally formed on the imaging apparatus 50. The arms 120 comprise support mounts for an illuminant head assembly 200. The other end of the imaging apparatus 50 comprises a sub-housing 64 which encloses a linear CCD photosensor device 66 (FIG. 4). The CCD is electrically mounted on a printed circuit board 63 but is physically supported directly from the sub-housing 64 as is more fully described in copending, commonly assigned U.S. application Ser. No. 09/083,359, the disclosure of which is incorporated herein by reference. The elongated housing of imaging apparatus 50 comprises the sole means of support of the CCD from the chassis frame 32. Spaced apart film guide pins 65a, 65b and 65c are located along one edge of the film path 38 to aid in accurately aligning magnetic recording tracks on the APS film with the magnetic read/write heads positioned in the apertures 41a, 41b. The lower frame 32 and upper plate 34 are molded in the desired configurations out of a suitable, preferably blackened, 30% glass filled polycarbonate material held together by screw fasteners (not shown). The use of this material is highly beneficial in this application because of its stability in the presence of humidity and temperature changes which is particularly important in this configuration wherein the photosensor relies on the housing as the sole means of support from the scanning film plane.

Referring jointly to FIGS. 4–9, details of the imaging apparatus 50 of the present invention will be described. Imaging apparatus 50 comprises a hollow, two-piece molded housing 70 having an upper, main body portion 72 and a separable, lower body portion 74. The main body portion 72 is molded in the desired configuration out of a high glass content polycarbonate, preferably with a glass loading of 30% or higher. This allows for alignment features such as integral film rails 84, lens mount collar segments 102, mirror mount ridges 91 and an integral sub-housing 64 to be molded as one unit with a low coefficient of thermal expansion thereby minimizing shifts in alignment of the various components as well as shifts in the focal plane (film plane) 86. The lower body portion 74 is molded in the desired configuration using an unfilled polycarbonate, preferably with no glass loading. This allows for economical tolerances to be applied to the spring locking rings 110 as well as for the spring fingers 104 and compressive spring fingers 92. Lower body portion 74 could be molded from other materials, including glass filled polycarbonate, but the tolerances on the features described would need to be held closer to the nominal dimensions to avoid catastrophic failure of them.

One end 80 of the housing 70 comprises a film scanning portion and the other end 82 comprises a light sensor portion. The film scanning end 80 includes an elongated light entry slot 83. As best seen in FIG. 4a, a pair of film rails 84 are integrally molded onto the end of the imaging apparatus so as to bridge the slot 83 longitudinally in the direction of film path 38 to thereby define a film plane 86. For this purpose, the film rails 84 are spaced apart only slightly more than the lateral dimension of the negative image on the film strip. The other end 82 of the housing 70 includes sub-housing 64 which encloses linear CCD 66 mounted on printed wiring board 63. As described in aforementioned copending application Ser. No. 09/083,359, CCD 66 is supported from sub-housing 64 by means of radiation, preferably UV, curable adhesive "rivets". These rivets are formed by injecting the adhesive in viscous form through holes 88 with a slight excess of the adhesive overlapping the hole circumference inside and outside the sub-housing and curing the adhesive by exposure to UV radiation source after the CCD as been properly aligned with the slot light entry 83 and film plane 86. Notch 89, and a similar notch on the far side of sub-housing 64, allow access by the UV radiation to the adhesive material inside the sub-housing 64 during the curing step.

Figure 5:
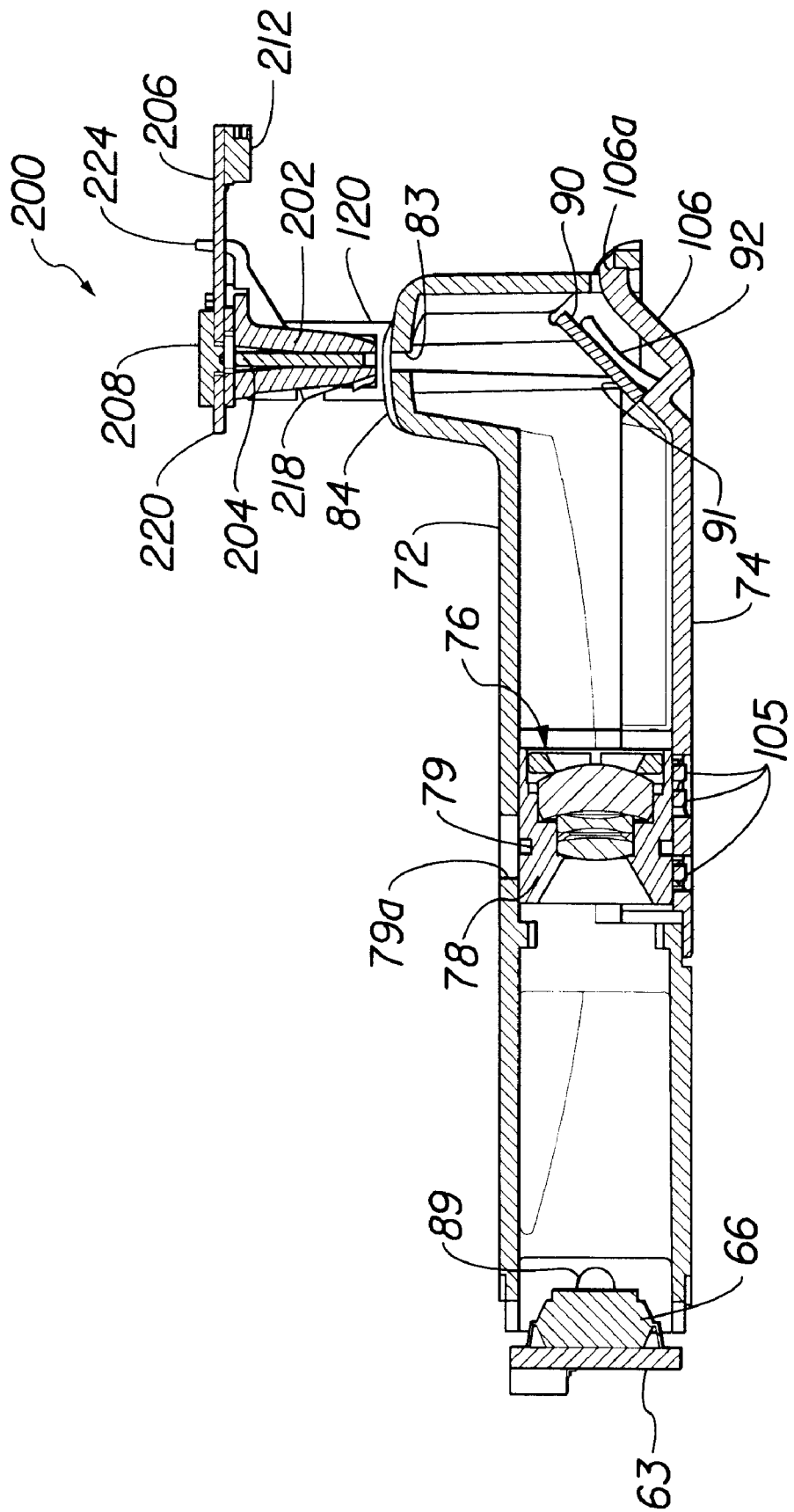
FIG. 5 is a cross section side elevation view of the imaging apparatus and illumination head of FIG. 4.
Figure 6:
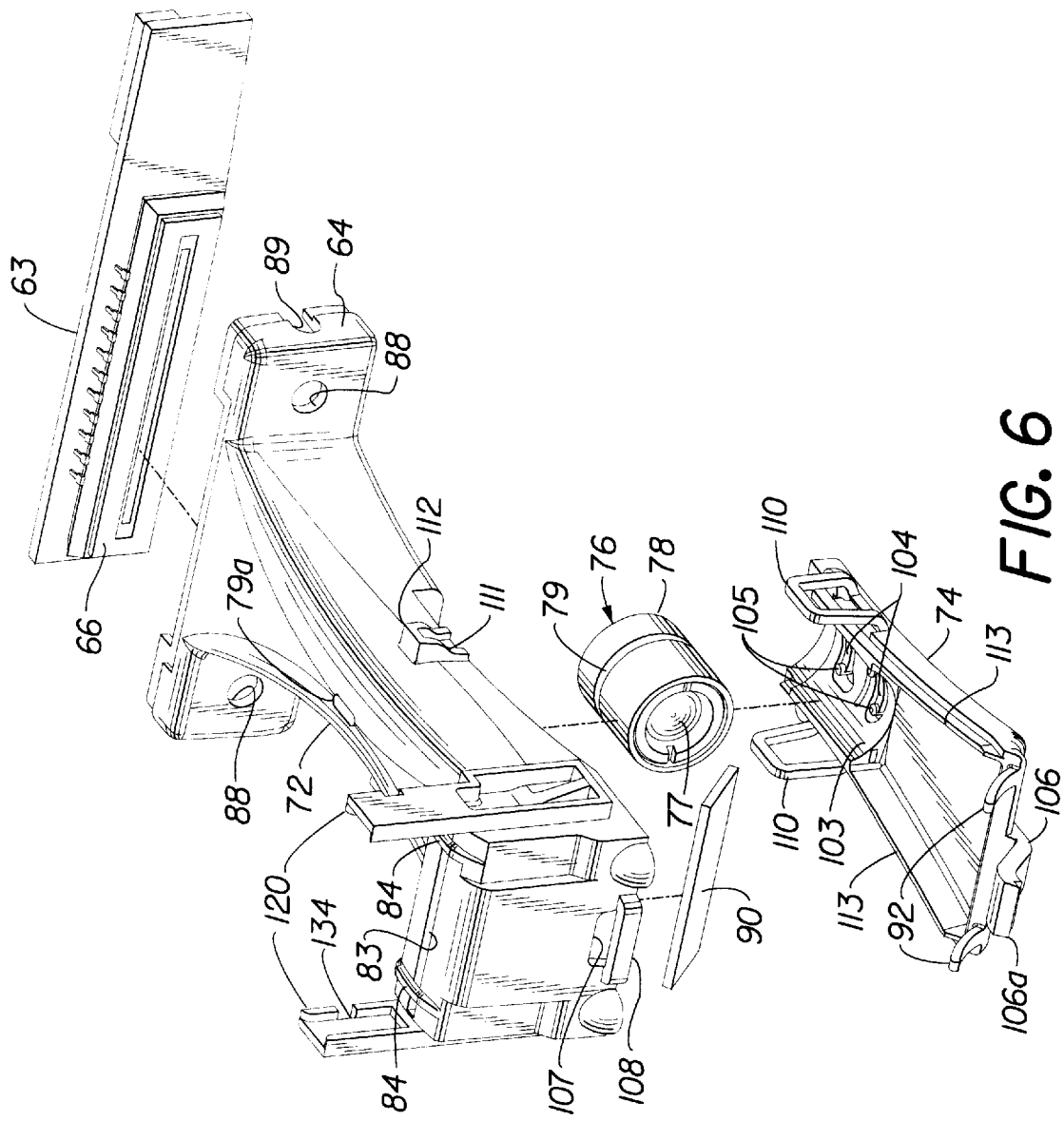
FIG. 6 is an exploded perspective view from above of the imaging apparatus of FIG. 4.
Figure 7:
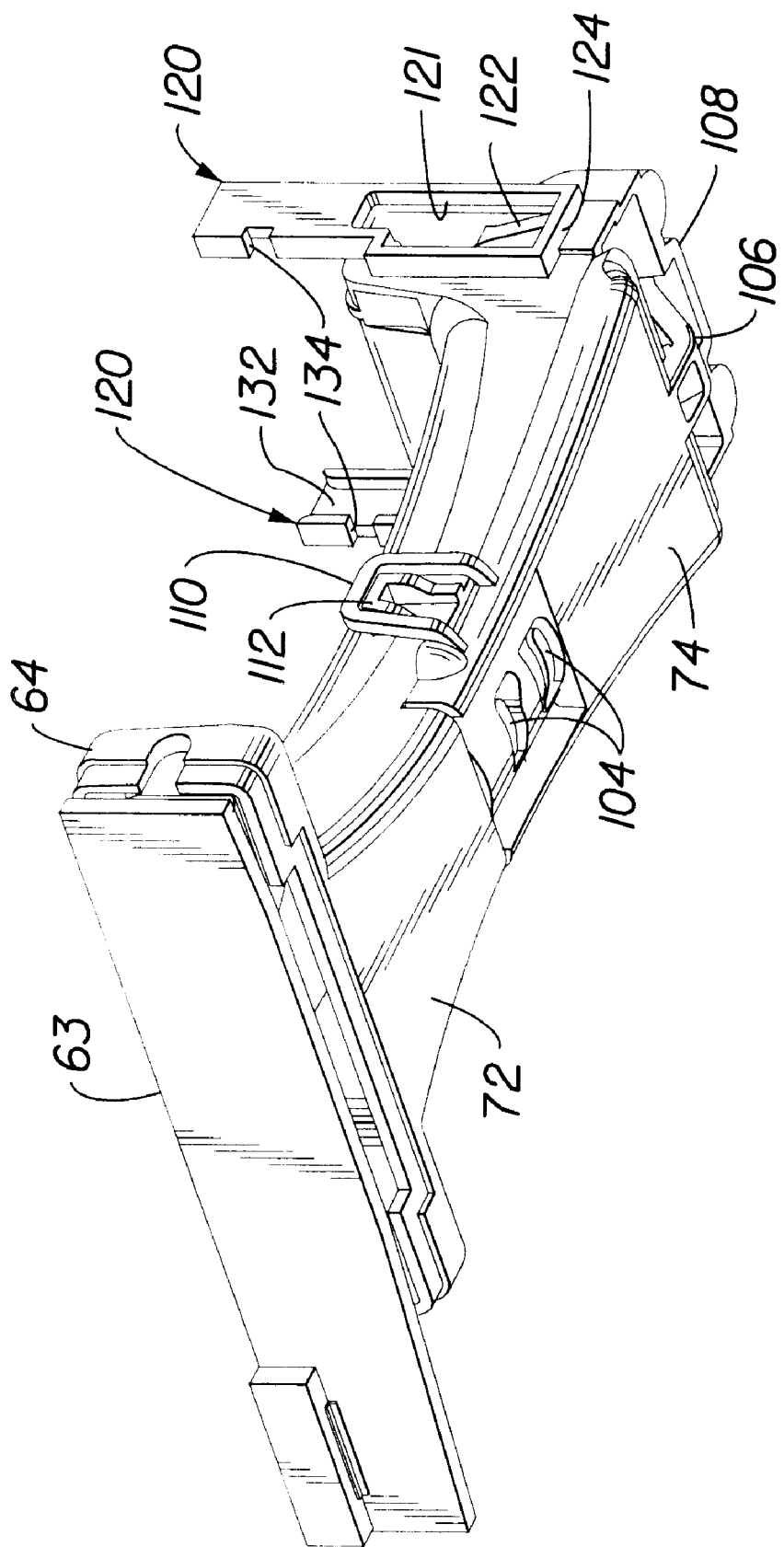
FIG. 7 is a perspective view from below of the imaging apparatus of FIG. 4.
Figure 8:
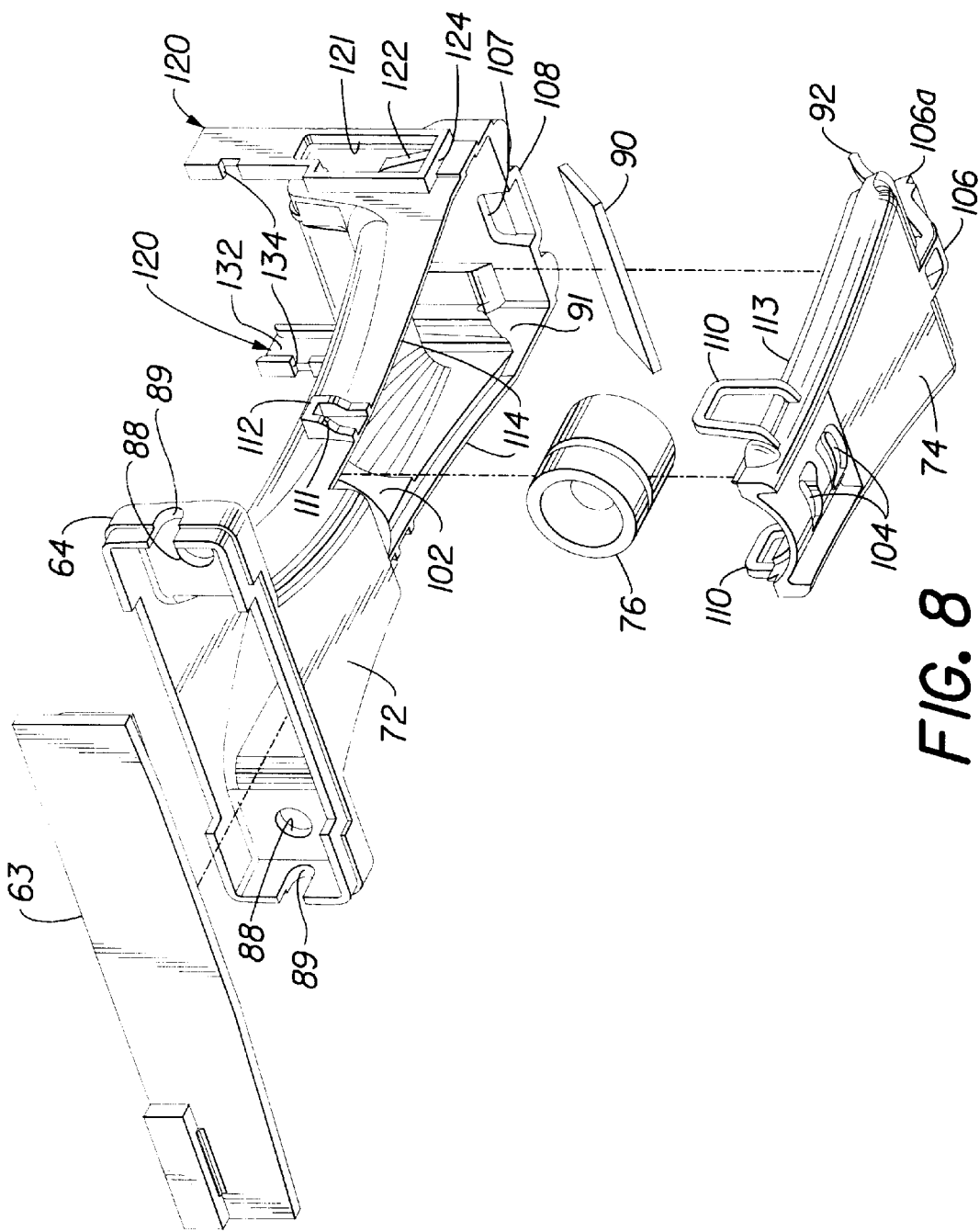
FIG. 8 is an exploded perspective view from below of the imaging apparatus of FIG. 4.

The upper body portion 72 of the housing 70 is formed at right angles between the scanning end 80 and the photosensor end 82 to provide a compact structure enabling mounting of the film scanner in a drive bay of a personal computer. To this end, a mirror 90 is mounted internally against ridges 91 formed inside the upper housing body 72 at a 45° angle to serve as reference datum surfaces for mounting of the mirror 90. As best seen in FIGS. 5 and 6, the mirror is held in place against the ridges 91 by means of compressive spring fingers 92 formed on the housing lower body portion 74. Internally of housing body portions 72 and 74, about half way between mirror 90 and CCD 66 there is provided upper and lower collar segments 102, 103, respectively, which serve to receive and hold a focusing lens assembly 76 in axial alignment with the light path from the scanning end 80 via the mirror 90 to the photosensor end 82. The focusing lens assembly 76 includes a focusing lens 77 positioned within a cylindrical lens mount 78. The lens mount 78 is provided with a circumferential groove 79 for use in setting the focus position of the lens 76 during assembly and alignment of the imaging apparatus. To this end, the housing upper body portion 72 is provided with an adjustment slot 79a extending longitudinally of the housing 70 through the upper collar segment 102. During the assembly process, a probe can be inserted through the slot 79a to move the lens mount 78 axially to focus the film plane 86 onto the CCD sensor 66. Flexible spring fingers 104 with pressure pads 105 are molded into the lower collar segment 103 to temporarily hold the lens mount 78 in place until focusing alignment is completed, at which time the lens is permanently retained by adhesive injected through either one or both of the space bridging the spring fingers with the lens mount 78 and the lens adjustment slot 79a in the upper body portion 72, preferably the latter. This secures the cylindrical lens mount 78 to the upper body portion 72, thereby fixing the alignment to the linear CCD 66, mirror 90 and film rails 84. The spring fingers 104 are sized such that the contact force, determined by the deflection after assembly of the fingers, is enough to hold the focusing lens assembly 76 in place during the assembly process and the yield stress of the material is not exceeded. The spring fingers can be made from other materials such as spring steel and insert molded with the lower body portion 74 to achieve the same result but integrating as part of the lower body portion 74 reduces the number of parts needed to fit the function and therefore lowers the cost of the assembly. A similar approach could by employed with the compressive spring fingers 92.

Assembly of the housing 70 is a very simple matter of inverting the upper housing body portion 72, inserting the focusing lens assembly 76 into the upper collar segment 102, placing the mirror 90 on the ridges 91 and then snapping the lower housing body portion into place. To accomplish this latter action, a cantilevered retention arm 106, which is integrally molded on the end of housing body portion 72, has its hook end 106a inserted into opening 107 on the upper body portion in engagement with retention bar 108. The body portion 74 is then rotated down to engage spring locking rings 110 with ramp surfaces 111 of locking tabs 112, the locking rings riding up over the ramp surfaces and locking onto the tabs when the lower body 74 portion is in place on the upper body portion. Once assembled, lips 113 and 114 mate to block light and contaminants from entering the housing 70. Similarly, once the CCD photosensor is aligned and focusing of lens 77 is completed, a black epoxy adhesive (not shown) is filled in between the printed circuit board 63 and the sub-housing 64 to block light and contaminant entry and around the lens retaining spring fingers 104 as described above. As an alternative to the use of black adhesive around the printed circuit board, any material to block light and contaminant entry may be used, for example, a wide rubber band slipped in place over the openings between the sub-housing and printed circuit board.

Figure 9:
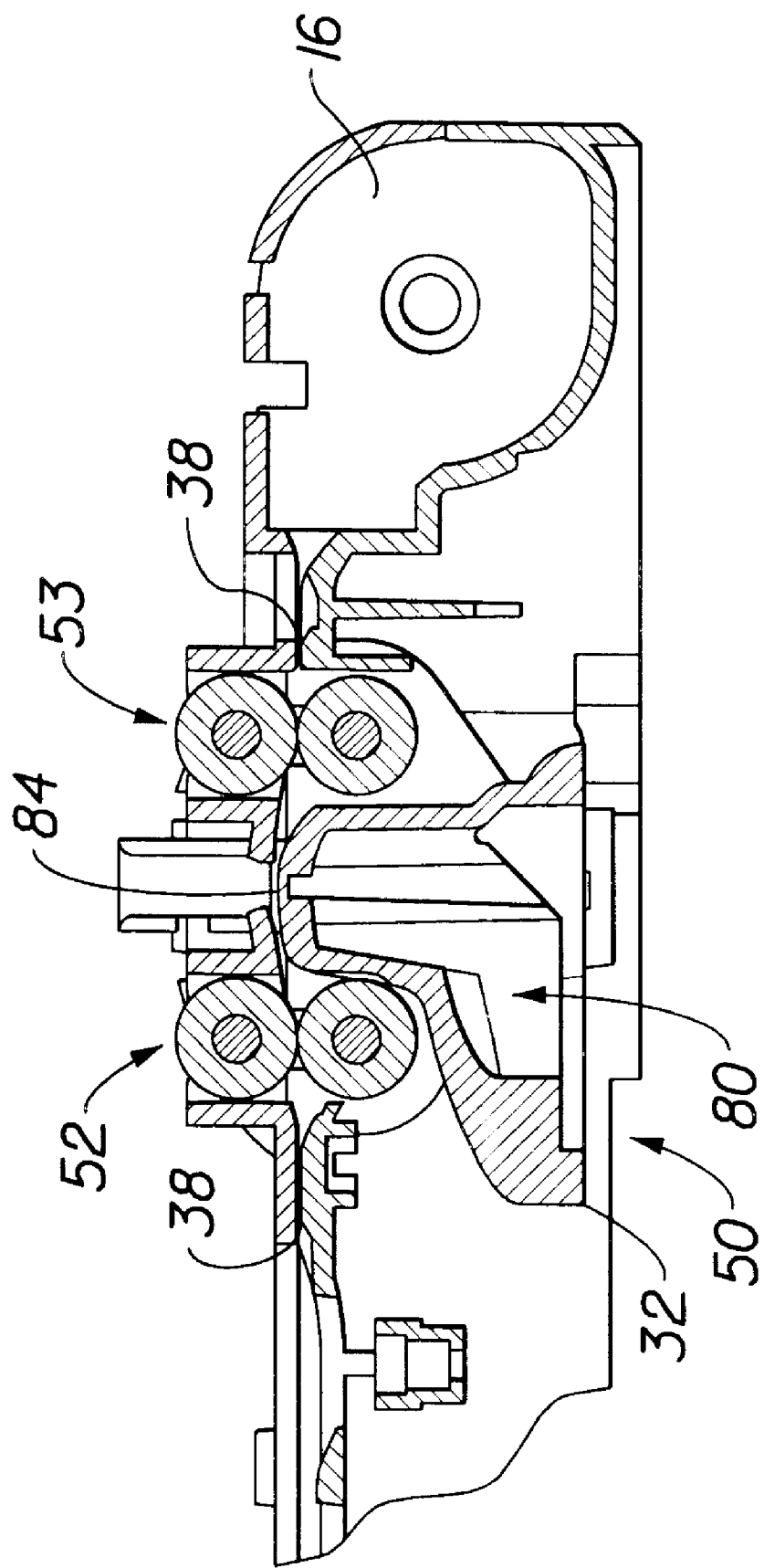
FIG. 9 is a cross section side elevation view of the imaging apparatus of FIG. 4 showing certain details of the mounting of the imaging apparatus of FIG. 4 in the chassis frame of FIGS. 2 and 3.
Figure 10:
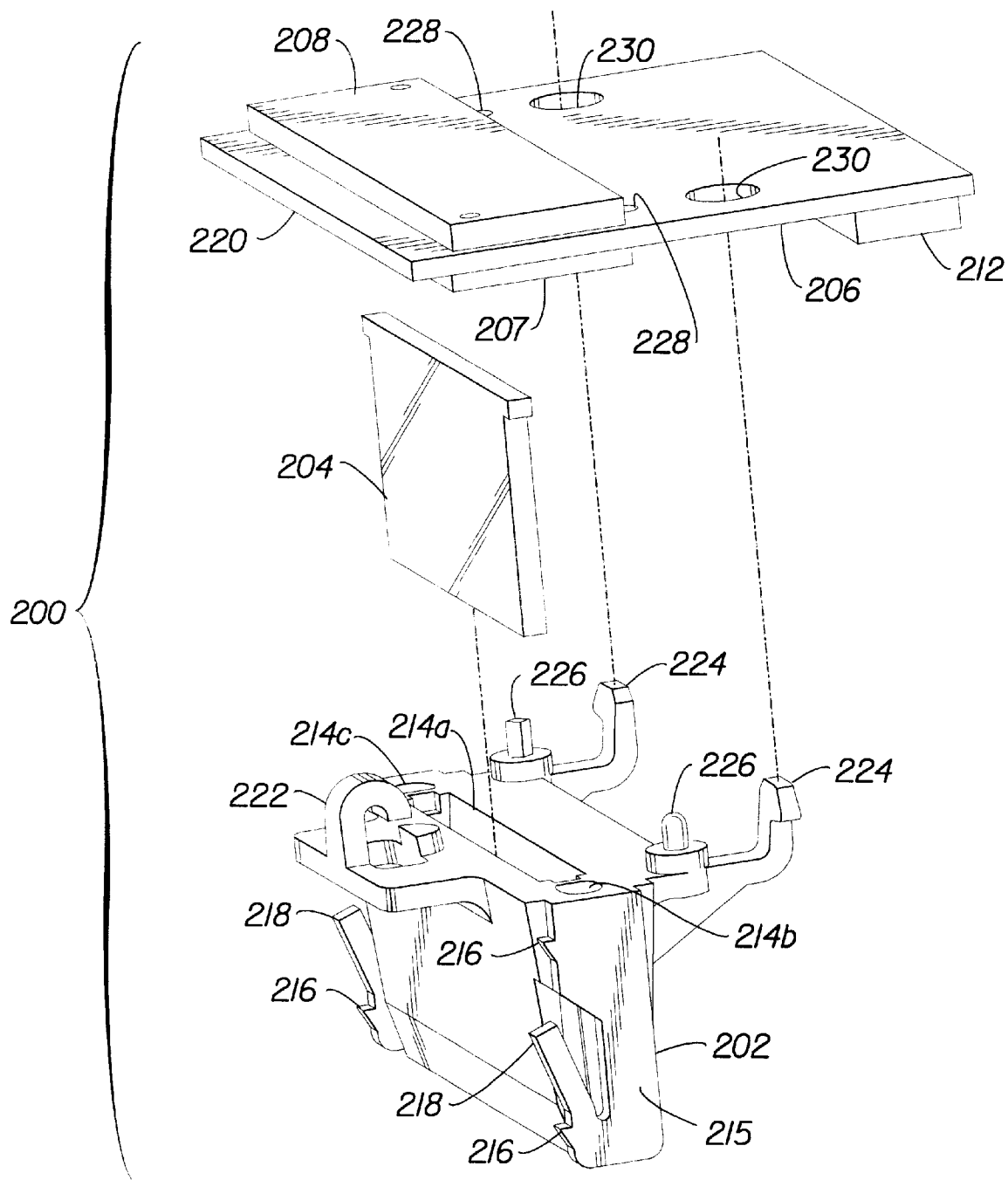
FIG. 10 is an exploded perspective view from above of the illumination head shown in FIGS. 5 and 6.
Figure 11:
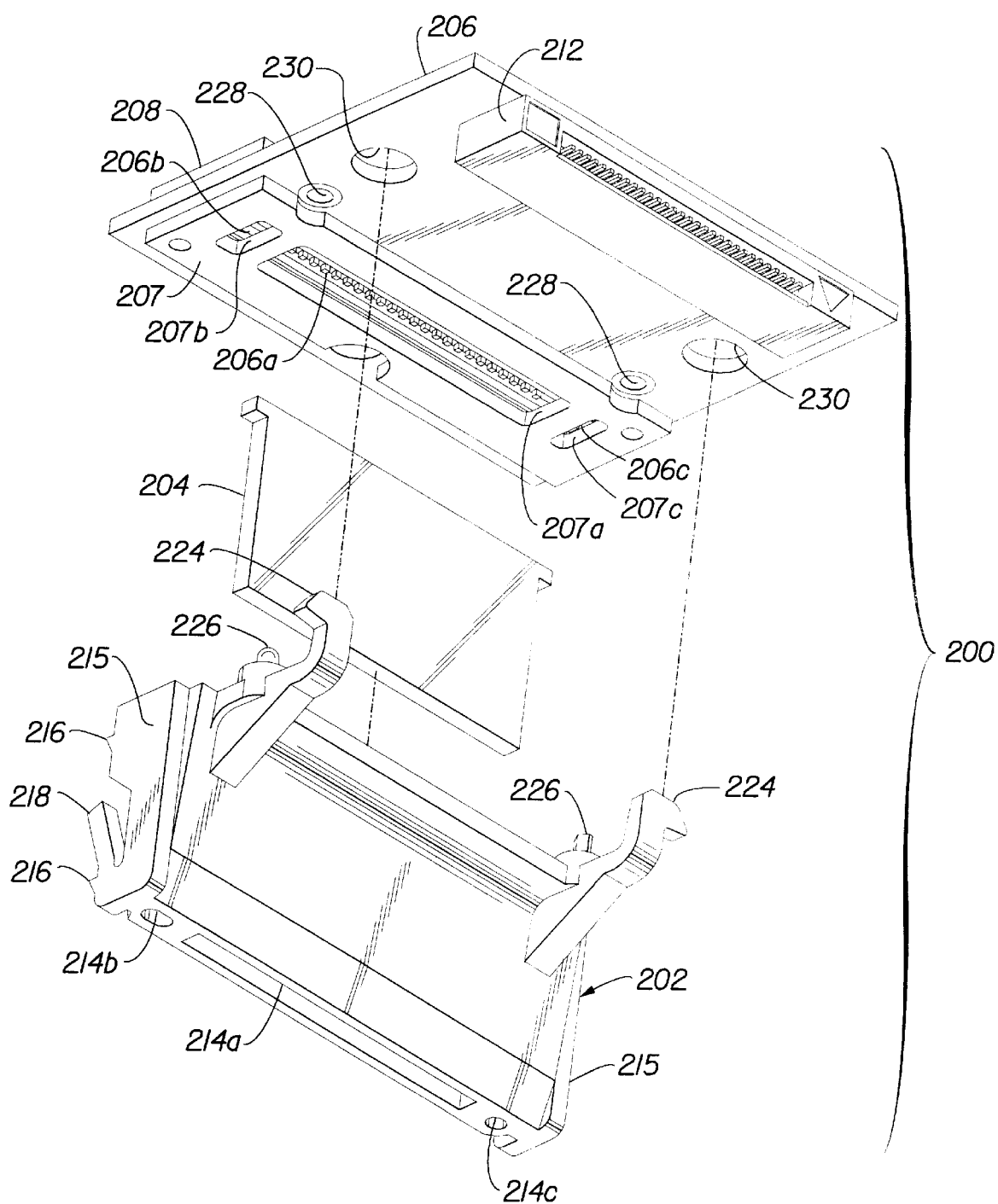
FIG. 11 is an exploded perspective view from below of the illumination head shown in FIGS. 5 and 6.

Integrally formed on the outer lateral sides of the scanning end 80 of the housing 70 are a pair of support arms 120 that serve the dual functions of supporting the housing 70 on the chassis lower frame and supporting an illumination assembly precisely over the light entry slot 83. The support arms are preferably integrally molded on the upper body 72 and are mirror images of each other. The lower portion of the support arm 120 includes a recessed portion 121 at the bottom of which there is provided a ramp 122 leading to the lower retention edge 124. The upper portions of each of the support arms 120 are provided with a channel 132 and notches 134, the purpose of which is explained below. Turning back briefly to FIGS. 3 and 3A, it will be seen that the chassis lower frame 32 includes a pair of integrally molded, downwardly extending retention arms 130 each of which has at the bottom thereof an inwardly extending retention hook 131. The retention arms 130 are springlike and flex outwardly to permit insertion of the scanning end 80 of the illumination housing 70 onto the chassis lower frame 32. The inner surface of one of the arms is provided with a tapered ridge 133 which serves to urge the housing end into solid contact with the chassis frame. During assembly, with the chassis frame inverted, the support arms 120 are inserted downwardly into position between the retention arms 130. The retention hooks 132 initially fall into the recessed portions 121 and eventually engage the ramps 122 at which point the retention arms are flexed outwardly until the retention hooks clear the retention edges 124. The scanning end of the housing is now rigidly and securely captured between the retention arms 130. Once this is completed, the lower frame can be turned right side up for addition of the drive roller sets 52 and 53 and the upper chassis plate 34. As can best be seen in FIG. 2, the upper portions of the support arms extend above the chassis 30. As will be seen, this allows insertion of an illuminant head assembly 200 into the channels 132 of the support arms. As shown in FIG. 9, when the scanning end 80 of the imaging apparatus 50 is fully inserted into position on the lower chassis frame 32, the integral film rails bridging the light entry slot 83 are slightly curved and are positioned slightly above the level of the nip contact of the nip roller sets 52,53 and the film rail extensions in the film path 38 extending before and after the imaging apparatus. This is to cause the film to be slightly curved longitudinally as it passes over the scanning light entry slot thereby enhancing the lateral flatness of the film plane over the scanning slot 83. By integrating the film rails 84 into the upper body portion 72, the film plane 86 is maintained in precise position relative to the linear CCD 66 regardless of the positioning of the imaging apparatus housing 70 to the film path 38. This allows for liberal alignment tolerances between the lower frame 32 and imaging apparatus 50.

Referring jointly to FIGS. 4, 5, 10 and 11, the illuminant head assembly 200 will now be described. The illuminant head assembly 200 comprises a main body 202, a planar light pipe 204, a printed circuit board 206 on which are mounted a linear array of red, green and blue LEDs 206a and additional LEDs 206b and 206c positioned at opposite ends of the linear array 206a. The linear array provides spectral red, green and blue illuminant for scanning of image areas on the film. The additional LEDs serve as respective sources of light for reading of bar code data (LED 206b) and for sensing of reference perforations in the film (LED 206c). However, since Dmin density of the film is almost transparent in the red spectrum, LED 206c is selected to emit in another color spectrum such as green or blue. A heat sink panel 208 is mounted on the opposite side of the circuit board from the LEDs 206a–206c. An apertured panel 207 is mounted over the LEDs on the circuit board and is provided with an elongated aperture 207a aligned with the linear LED array 206a and two smaller apertures 207b and 207c aligned with LEDs 206b and 206c, respectively. Panel 207 serves as a dam to retain a clear silicone sealant disposed in each of the apertures 207a–207c. The circuit board 206 also carries a connector 212 providing power connections to the LEDs.

The main body 202, made of a suitable highly reflective, white polycarbonate material, is provided with an elongated, planar light channel 214a into which light pipe 204 is inserted. Light pipe 204 is preferably made from a clear polymethylmethacrylate material doped with a diffusion material such as barium sulfate so as to convert specular light from the LEDs 206a to a diffuse, non-specular illumination at the bottom outlet of the head 202. Smaller side channels 214b and 214c, do not have light pipe material therein, serve to convey the illumination from LEDs 206b and 206c, respectively, to the bar coded data and reference perforations along the longitudinal edges of the film. The sides 215 of the main body 202 are shaped to fit into the channels 132 of the previously described support arms 120. Pointed crush ribs 216, which engage the edges of the channels 132, ensure a tight fit of the body sides 215 in the channels. Sides 215 of the main body are also provided with locking tabs 218 which engage notches 134 in the support arms to rigidly lock the head assembly into the support arm structure. The parts of the head assembly are easily snapped together by slipping end 220 of the printed wiring board under a capture hook 222 formed on the main body 202, best seen in FIG. 10, and rotating the printed wiring board down to align locating pins 226 with mating holes 228 and to snap locking hooks 224 into mating locking holes 230. The arrangement described is a simple, practical self aligning mounting arrangement for attaching the head assembly 200 in a secure and rigid manner to the imaging apparatus 50.

It will be appreciated from the foregoing description that what has been described is a compact film scanner design including an illuminant head assembly and imaging apparatus of simple and compact design. The imaging apparatus conveniently consists of an integral design that can be easily snapped into place on the base chassis and can be easily removed and replaced for field repair without requiring intricate, time consuming alignment procedures and equipment in the field, the assembly and alignment being entirely at the manufacturer's location.

The invention has been described in detail with particular reference to certain preferred embodiments thereof, but it will be understood that variations and modifications can be effected within the spirit and scope of the invention.

PARTS LIST 10 film scanner
12 outer casing
14 front bezel
16 film cartridge chamber
18 spring-loaded door
20 locating device
22 door latch hook
24 door latching mechanism
30 film drive chassis
32 lower frame
34 upper plate
36 film takeup chamber
38 film path
40 film drive roller mechanism
41a,b read/write head apertures
42 read/write head assembly
43 pressure pad recesses
50 imaging apparatus
51 film scanner opening
52 nip roller set
53 nip roller set
54 drive gear
55 main drive rollers
56 main drive pulley
57 elastic drive belt
58 slave drive pulley
59 slave drive rollers
60 idler rollers
61 retention clamps
62 retention springs
63 printed wiring board
64 sub-housing
65a,b film guide pins
66 liner CCD
70 imaging apparatus housing
72 upper body portion
74 lower body portion
76 focusing lens assembly
77 focusing lens
78 cylindrical lens mount
79 lens mount groove
79a adjustment slot
80 housing scanning end
82 housing light sensor end
83 light entry slot
84 film rails
86 film plane
89 sub-housing notch
90 mirror
91 mirror mount ridges
92 compressive spring fingers
102 lens mount collar segment
103 lens mount collar segment
104 spring fingers
105 pressure pads
106 cantilevered retention arm
106a hook end
107 opening
108 retention bar
110 spring locking rings
111 ramp surfaces
112 locking tabs
113 lip
114 lip
120 support arms
121 recesses
122 ramp
124 retention edge
130 retention arms
131 retention hooks
132 channel
133 tapered ridge
134 locking notch
200 illuminant head assembly
202 main body
204 planar light pipe
206 printed circuit board
206a linear R,G,B LED array
206b,c red LEDs
207 apertured panel
207a,b,c apertures
208 heat sink panel
212 connector
214a,b,c light channels
215 body sides
220 printed wiring board end
222 capture hook
224 locking hooks
226 locating pins

What is claimed is:
1. An imaging apparatus for a photographic film scanner comprising:
   an elongated housing having first and second ends;
   an imaging lens assembly mounted within the housing;
   the first end of the housing having a scanning aperture formed therein and film rails integrally formed on the housing exteriorly thereof defining a scanning film plane; and a photosensor device mounted on the second end of the housing in precision alignment with the scanning aperture, the imaging lens assembly being adjusted and fixed in place for precision focus of the scanning film plane onto the photosensor device.

2. The imaging apparatus of claim 1, the elongated housing comprising first and second snap-together body portions.

3. The imaging apparatus of claim 1, wherein said elongated housing includes a mirror and said body portions comprise a right angle main body section and a snap-on cover section, the main body section having first and second surfaces for receiving said focusing lens and said mirror in a position for reflecting light from said scanning film plane at a right angle through said focusing lens to said photosensor device, said cover section being snapped in place after insertion of said lens and said mirror.

4. The imaging apparatus of claim 3 wherein said main body section includes at least one datum surface for positioning said mirror at a 45° angle intermediate said one end and said imaging lens assembly and said cover section includes a spring finger for holding said mirror in position against said at least one datum surface after said cover section is snapped in place on said main body section.

5. The imaging apparatus of claim 4 wherein said main body section and said cover section include mating snap locks for holding said main body section and said cover section together when said cover section is assembled to said main body section.

6. The imaging apparatus of claim 2, the snap-together body portions each having mating temporary lens holding collar segments for temporarily holding the imaging lens assembly in place while and after the housing pieces are snapped together.

7. The imaging apparatus of claim 3 wherein one of the snap-together body portions includes an access aperture at its lens holding collar segment allowing access to the lens for movement thereof to focus the scanning film plane onto the photosensor device during alignment of the photosensor device after assembly together of the snap-together body portions.

8. The imaging apparatus of claim 7 wherein said imaging lens assembly includes a cylindrical lens mount having a circumferential groove which aligns with said access aperture when said lens mount is positioned in the lens holding collar segments to allow movement of the lens mount with a pin inserted through said access aperture during focusing of the scanning film plane onto the photosensor device.

9. The imaging apparatus of claim 6, said imaging lens assembly including a lens mount; one of said snap-together body portions having an access aperture in communication with said lens mount after focusing of said film plane onto said photosensor; the apparatus further including an amount of adhesive extending through said access aperture in contact with said lens mount and said one snap-together body portion to permanently hold said lens mount fixedly in place.

10. The imaging apparatus of claim 6, wherein one of the snap-together body portions includes a first access aperture at the lens holding collar segment thereof allowing access to the lens for movement thereof to focus the film plane onto the photosensor device during alignment of the photosensor device after assembly together of the snap-together body portions; the lens holding collar segment of the other of said snap-together body portions having at least one integral spring finger extending inwardly of the housing to hold the lens temporarily in place.

11. The imaging apparatus of claim 10, wherein said imaging lens assembly includes a lens mount, said at least one spring finger being spaced slightly from surrounding portions of said other snap-together piece to form a spring finger aperture in communication with said lens mount after adjustment for focusing of said scanning film plane on said photosensor device; and said imaging apparatus includes an amount of adhesive applied after focusing of said scanning film plane on said photosensor, said adhesive extending through at least one of said access aperture and said spring finger aperture in contact with said lens mount and at least one of said other snap-together body portions to permanently hold said lens fixedly in place.

12. The imaging apparatus of claim 1, wherein said second end of the housing is formed as an elongated laterally extending sub-housing and said photosensor device is a linear CCD mounted within said sub-housing in said precision aligned and focused position.

13. A film scanner apparatus comprising:
a chassis frame having a film path and an opening in the film path;
an elongated imaging housing having first and second ends;
an imaging lens assembly mounted within the housing;
the first end of the housing having a scanning aperture and a film guide integrally formed thereon defining a scanning film plane; and
a photosensor device mounted on the second end of the housing in precision alignment with the scanning aperture, the imaging lens assembly being adjusted and fixed in place for precision focus of the integral film plane on the photosensor device;
the chassis frame and the first end of the imaging housing having mating snap-lock devices, the imaging housing being snap-locked in place in the film path opening of the chassis frame.

14. A film scanner apparatus comprising:
a chassis frame having a film path and an opening in the film path;
an elongated imaging apparatus including a first end having a scanning aperture formed therein and a film guide integrally formed on the elongated imaging apparatus exteriorly thereof defining a scanning film plane and including a second end having a photosensor device mounted thereon in precision alignment and focus with the scanning aperture and the scanning film plane;
the first end of the elongated imaging apparatus being mounted to the chassis at the film path opening and the photosensor device being supported at the second end of the imaging apparatus, the elongated imaging apparatus being the sole means of support of the photosensor device from the film path opening of the chassis frame.

15. The film scanner apparatus of claim 14, the first end of the imaging apparatus being snap-mounted to the chassis frame at the film path opening.

16. The film scanner apparatus of claim 14, the film path opening have a pair of spring-like mounting arms, first ends of which are integrally formed with opposing ends of the opening and second ends of which have inward extending hook tabs; the first end of said imaging apparatus having side portions adapted to engage said mounting arms to be snapped into mounting position in said film path opening, said side portions having retention end portions adapted to be engaged by said hook tabs for retention of said imaging apparatus in said mounting position.

17. The film scanner apparatus of claim 16, wherein one of said mounting arms includes an elongated tapered ridge on an inner surface facing the other mounting arm to serve to force said first end of said imaging apparatus into a rigid mounted position in said film path opening.

18. A film scanner apparatus comprising:
- a chassis frame having a film path and an opening in the film path;
- an elongated imaging apparatus having a first end including a linear scanning aperture and a film guide defining a scanning film aperture and having a second end including a linear photosensor precision aligned with said scanning aperture and said scanning film plane, said first end being removably attached to said chassis frame in said opening as a sole means of support of said imaging apparatus and linear photosensor from said chassis frame, the first end further including support arms extending through said opening beyond said film path; and
- an illuminant head assembly mounted on said support arms in alignment with said scanning aperture.

19. The film scanner apparatus of claim 18 wherein said scanning aperture extends substantially the full width of a film strip conveyed across said scanning aperture and said film guide comprises a pair of spaced apart film rails bridging said scanning aperture at a width of image frames on the film strip, said film rails defining a first scanning aperture region therebetween corresponding to said image frame width and at least a second scanning aperture region outside said film rails in alignment with a first feature of the film along a first marginal region of the film;
- the illuminant head assembly comprising an elongated light source extending across both said first and second scanning aperture regions.

20. The film scanner apparatus of claim 19 wherein said film rails define a third scanning aperture region outside said film rails in alignment with a second feature of the film along a second marginal region of the film and said elongate light source extends across all three scanning aperture regions.

* * * * *